United States Patent
Yook et al.

(10) Patent No.: US 12,404,374 B2
(45) Date of Patent: Sep. 2, 2025

(54) PHOTOCURABLE SILICONE COMPOSITION AND CURED PRODUCT THEREOF

(71) Applicants: DOW SILICONES CORPORATION, Midland, MI (US); DOW TORAY CO., LTD., Tokyo (JP)

(72) Inventors: Juyoung Yook, Chungcheongbuk-do (KR); Jongchan Park, Chungcheongbuk-do (KR); Atsushi Sugie, Ichihara (JP); Deokgu Kim, Chungcheongbuk-do (KR)

(73) Assignees: DOW SILICONES CORPORATION, Midland, MI (US); DOW TORAY CO., LTD., Tokyo (JP)

( * ) Notice: Subject to any disclaimer, the term of this patent is extended or adjusted under 35 U.S.C. 154(b) by 653 days.

(21) Appl. No.: 17/778,057

(22) PCT Filed: Nov. 19, 2020

(86) PCT No.: PCT/US2020/061167
§ 371 (c)(1),
(2) Date: May 19, 2022

(87) PCT Pub. No.: WO2021/102074
PCT Pub. Date: May 27, 2021

(65) Prior Publication Data
US 2023/0013987 A1    Jan. 19, 2023

Related U.S. Application Data

(60) Provisional application No. 62/939,639, filed on Nov. 24, 2019.

(51) Int. Cl.
| | | |
|---|---|---|
| *C08G 77/20* | (2006.01) | |
| *C08J 3/28* | (2006.01) | |
| *C08K 5/3492* | (2006.01) | |
| *C08K 5/37* | (2006.01) | |
| *C08K 5/5313* | (2006.01) | |

(52) U.S. Cl.
CPC .............. *C08G 77/20* (2013.01); *C08J 3/28* (2013.01); *C08K 5/3492* (2013.01); *C08K 5/37* (2013.01); *C08K 5/5313* (2013.01); C08G 2170/00 (2013.01); C08G 2190/00 (2013.01)

(58) Field of Classification Search
None
See application file for complete search history.

(56) References Cited

U.S. PATENT DOCUMENTS

| | | |
|---|---|---|
| 3,661,744 A | 5/1972 | Kehr et al. |
| 4,808,638 A | 2/1989 | Steinkraus et al. |
| 4,946,874 A | 8/1990 | Lee et al. |
| 5,158,988 A | 10/1992 | Kurita et al. |
| 5,795,650 A | 8/1998 | Watanabe et al. |
| 6,800,366 B2 | 10/2004 | Chang et al. |
| 8,293,810 B2 | 10/2012 | Ito et al. |
| 8,716,362 B2 | 5/2014 | Ono et al. |
| 8,865,787 B2 | 10/2014 | Sakamoto |
| 2006/0007519 A1 | 1/2006 | Kanouni et al. |
| 2009/0296033 A1 | 12/2009 | Shinya et al. |
| 2012/0202911 A1 | 8/2012 | Mitsuoka et al. |
| 2013/0065983 A1* | 3/2013 | Ono .................. C08L 83/08 522/172 |
| 2013/0149455 A1 | 6/2013 | Ooike et al. |
| 2013/0271828 A1 | 10/2013 | Everaerts et al. |
| 2016/0032102 A1 | 2/2016 | Srikanth et al. |
| 2017/0298188 A1 | 10/2017 | Dutta et al. |
| 2018/0009953 A1 | 1/2018 | Lu et al. |
| 2018/0362764 A1 | 12/2018 | Dutta et al. |
| 2019/0112430 A1 | 4/2019 | Yook et al. |
| 2020/0032111 A1 | 1/2020 | Ogawa et al. |

FOREIGN PATENT DOCUMENTS

| | | |
|---|---|---|
| CN | 105492539 A | 4/2016 |
| CN | 109923175 A | 6/2019 |
| EP | 0437247 A2 | 7/1991 |
| EP | 0456346 A2 | 11/1991 |
| JP | 102245060 A | 9/1990 |
| JP | H02233764 A | 9/1990 |
| JP | H0364389 A | 3/1991 |
| JP | H05156163 A | 6/1993 |

(Continued)

OTHER PUBLICATIONS

International Search Report for PCT/US2020/061165 dated Mar. 16, 2021, 5 pages.
International Search Report for PCT/US2020/061167 dated Mar. 16, 2021, 4 pages.
Machine assisted English translation of KR101695316B1 obtained from https://patents.google.com/patent on Nov. 7, 2022, 12 pages.
Machine assisted English translation of JPH07134538A obtained from https://patents.google.com/patent on Nov. 7, 2022, 5 pages.
Machine assisted English translation of JPH02245060A obtained from https://worldwide.espacenet.com/patent on Nov. 7, 2022, 5 pages.

(Continued)

*Primary Examiner* — Sanza L. McClendon
(74) *Attorney, Agent, or Firm* — Warner Norcross + Judd LLP

(57) ABSTRACT

A photocurable silicone composition is disclosed. A cured product of the composition is also disclosed, as well as methods of forming the same. The photocurable silicone composition comprises: (A) a specific organopolysiloxane having alkenyl groups in a molecule; (B) a compound having at least two thiol groups in a molecule; (C) a photoradical initiator having a phosphorus atom; and (D) a specific hydroxyphenyl triazine compound. The composition exhibits excellent curability by LED lamp with wide UV-Visible range as well as metal-halide lamp, and cures to form a cure product exhibiting excellent resistance to light.

10 Claims, No Drawings

(56) References Cited

FOREIGN PATENT DOCUMENTS

| JP | H07134538 A | 5/1995 |
|---|---|---|
| JP | 2008282000 A | 11/2008 |
| JP | 2012103705 A | 5/2012 |
| JP | 2013253179 A | 12/2013 |
| JP | 2016146468 A | 8/2016 |
| JP | 2019507813 A | 3/2019 |
| KR | 101695316 B1 | 1/2017 |
| WO | 2015030224 A1 | 3/2015 |
| WO | 2015148318 A1 | 10/2015 |
| WO | 2017082180 A1 | 5/2017 |
| WO | 2017155919 A1 | 9/2017 |
| WO | 2019099347 A1 | 5/2019 |

OTHER PUBLICATIONS

Machine assisted English translation of JPH0364389A obtained from https://worldwide.espacenet.com/patent on Nov. 7, 2022, 4 pages.
Machine assisted English translation of JP2013253179A obtained from https://patents.google.com/patent on Nov. 7, 2022, 12 pages.
Machine assisted English translation of JPH02233764A obtained from https://worldwide.espacenet.com/patent on Nov. 7, 2022, 5 pages.
Machine assisted English translation of JP2012103705A obtained from https://worldwide.espacenet.com/patent on Nov. 28, 2023, 22 pages.
Machine assisted English translation of JP2016146468A obtained from https://worldwide.espacenet.com/patent on Jan. 12, 2023, 17 pages.

\* cited by examiner

PHOTOCURABLE SILICONE COMPOSITION AND CURED PRODUCT THEREOF

CROSS-REFERENCE TO RELATED APPLICATIONS

This application is the U.S. National Stage of International Application No. PCT/US2020/061167 filed on 19 Nov. 2020, which claims priority to and all advantages of U.S. Provisional Patent Application No. 62/939,639 filed on 24 Nov. 2019, the content of which is incorporated herein by reference.

FIELD OF THE INVENTION

The present invention relates to a photocurable silicone composition and a cured product thereof.

DESCRIPTION OF THE RELATED ART

A curable silicone composition having good optical transparency and high elongation property is utilized as an adhesive or pressure sensitive adhesive. Especially, a photocurable silicone composition enabling relatively low curing temperature such as less than 40° C. is mainly used for an optical display because thermally instable components like liquid crystalline, OLED, touch panel, and cover lens are needed to use the image display unit.

Patent Document 1 proposes an ultraviolet radiation-curable silicone composition comprising: a straight-chain organopolysiloxane having an aliphatic unsaturated group; an organopolysiloxane having a silicon atom-bonded mercaptoalkyl group; an acylphosphine oxide-based photoreaction initiator; and acetophenone and/or propiophenone.

However, such an ultraviolet radiation-curable silicone composition has a problem of poor deep curability by ultraviolet radiation and insufficient curing, and a problem of occurrence of coloring and haze caused by exposure of the silicone cured product to high temperature or high humidity conditions.

Patent Document 2 proposes a photocurable silicone composition comprising: an organopolysiloxane having at least one aryl group having from 6 to 12 carbons and at least one alkenyl group having from 2 to 12 carbons in a molecule, an organic compound having at least two ether bonds and at least one aliphatic carbon-carbon double bond in a molecule, a compound having at least two thiol groups in a molecule, a photoradical initiator having a phosphorus atom, and a hindered phenol compound. The photocurable silicone composition cures by irradiation with an active energy ray to form a cured product that suppresses reduction in transmittance due to coloring and haze even when being left in high temperature/high humidity conditions.

However, such a photocurable silicone composition has a problem that, exhibiting excellent resistance to light, and poor curability by LED lamp with wide UV-Visible range (365-405 nm) as well as metal-halide lamp.

CITATION LIST

Patent Literature

Patent Document 1: Japanese Unexamined Patent Application Publication No. 2013-253179 A Patent Document 2: International Publication No. WO 2017/155919 A1

BRIEF SUMMARY OF INVENTION

Technical Problem

An object of the present invention is to provide a photocurable silicone composition that exhibits excellent curability by LED lamp with wide UV-Visible range as well as metal-halide lamp, and cures to form a cured product exhibiting excellent resistance to light. Another object of the present invention is to provide a cured product exhibiting excellent resistance to light.

Solution to Problem

The photocurable silicone composition of the present invention comprises:

(A) 100 parts by mass of an organopolysiloxane represented by the following average composition formula:

wherein, $R^1$ is an alkenyl group having from 2 to 12 carbons, $R^2$ is an alkyl group having from 1 to 12 carbons, an aryl group having from 6 to 12 carbons, or an aralkyl group having from 7 to 12 carbons; provided that, at least 30 mol % of $R^2$ in a molecule are the aryl groups or the aralkyl groups; and "a" and "b" are positive numbers satisfying: $1 \leq a+b \leq 2.5$ and $0.001 \leq a/(a+b) \leq 0.2$;

(B) a compound having at least two thiol groups in a molecule, in an amount that the amount of the thiol groups in the present component is in a range of from 0.2 to 2.0 mol per 1 mol of the total alkenyl groups in component (A);

(C) from 0.01 to 5 parts by mass of a photoradical initiator having a phosphorus atom; and (D) from 0.001 to 2 parts by mass of a hydroxyphenyl triazine compound represented by the following general formula:

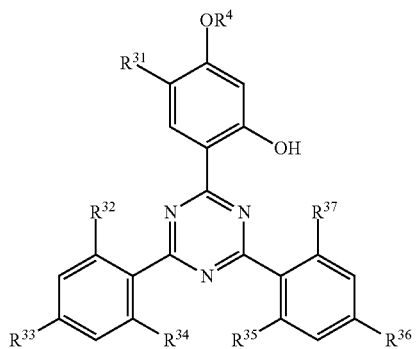

wherein, $R^{31}$, $R^{32}$, $R^{33}$, $R^{34}$, $R^{35}$, $R^{36}$ and $R^{37}$ are the same or different, and are groups selected from hydrogen atoms, hydroxy groups or alkyl groups having from 1 to 12 carbons, $R^4$ is a linear or branched alkyl group having from 6 to 12 carbons or a group represented by the following general formula:

wherein, $R^5$ is a linear or branched alkyl group having from 6 to 20 carbons.

In various embodiments, $R^{31}$, $R^{34}$ and $R^{35}$ in component (D) are hydrogen atoms and $R^{32}$, $R^{33}$, $R^{36}$ and $R^{37}$ in component (D) are hydrogen atoms or alkyl groups having from 1 to 12 carbons.

In various embodiments, $R^4$ in component (D) is a group represented by the following general formula:

—CH$_2$CH(OH)CH$_2$OR$^5$ wherein, $R^5$ is a linear or branched alkyl group having from 6 to 20 carbons.

In various embodiments, component (D) is an hydroxyphenyl triazine compound selected from a hydroxyphenyl triazine compound represented by the following formula:

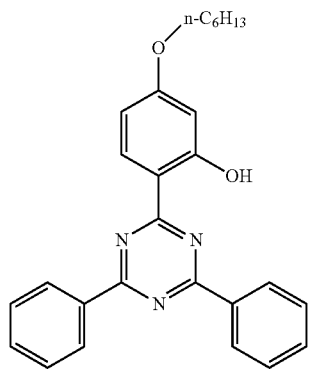

a hydroxyphenyl triazine compound represented by the following formula:

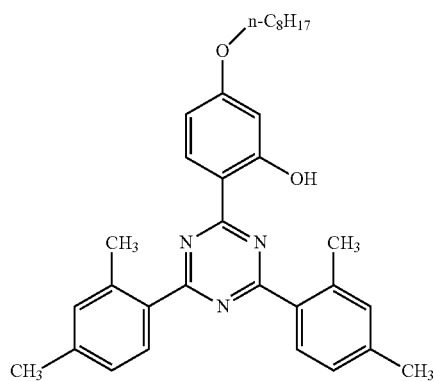

a hydroxyphenyl triazine compound represented by the following formula:

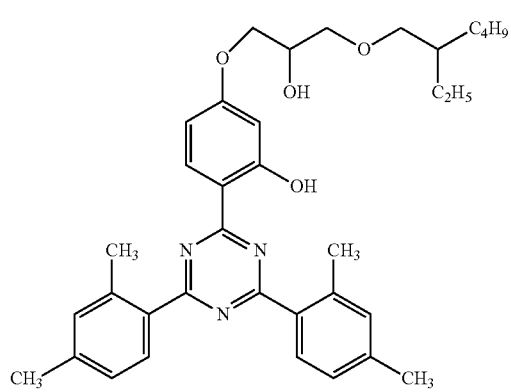

a hydroxyphenyl triazine compound represented by the following formula:

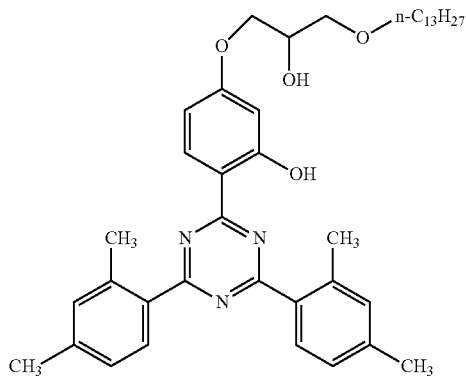

a hydroxyphenyl triazine compound represented by the following formula:

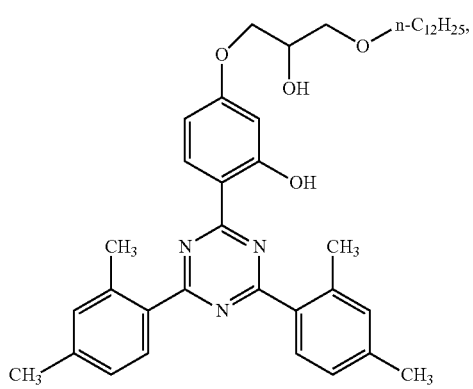

and mixtures thereof. For example, component (D) may comprise just one, or two or more of the aforementioned compounds.

The cured product of the present invention is obtained by irradiating the photocurable silicone composition described above with light. In various embodiments, the cured product is laminated between same or different substrates, and especially, between same or different substrates in an optical device.

Effects of Invention

The photocurable silicone composition of the present invention exhibits excellent curability by LED lamp with wide UV-Visible range as well as metal-halide lamp, and cures to form a cure product exhibiting excellent resistance to light. Furthermore, the cured product of the present invention exhibits excellent resistance to light.

DETAILED DESCRIPTION OF THE INVENTION

The terms "comprising" or "comprise" are used herein in their broadest sense to mean and encompass the notions of "including," "include," "consist(ing) essentially of," and "consist(ing) of". The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, 0-10, 0-5, or ±0-2.5, % of the numerical values. Further, the term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

<Photocurable Silicone Composition>

Component (A) is a base compound of the present composition and is an organopolysiloxane represented by the average composition formula:

$$R^1_a R^2_b SiO_{(4-a-b)/2}.$$

In the formula, $R^1$ is an alkenyl group having from 2 to 12 carbons, and examples thereof include vinyl group, allyl group, butenyl group, pentenyl group, hexenyl group, heptenyl group, octenyl group, nonenyl group, decenyl group, undecenyl group, and dodecenyl group. Among these, vinyl group and hexenyl group are preferred.

In the formula, $R^2$ is an alkyl group having from 1 to 12 carbons, an aryl group having from 6 to 12 carbons, or an aralkyl group having from 7 to 12 carbons. Examples of the alkyl group include methyl group, ethyl group, propyl group, isopropyl group, butyl group, pentyl group, hexyl group, heptyl group, octyl group, nonyl group, decyl group, undecyl group, and dodecyl group. Among these, methyl group is preferred. Examples of the aryl group include phenyl group, tolyl group, naphthyl group, and biphenyl group. Among these, phenyl group is preferred. Examples of the aralkyl group include phenylmethyl group, 1-phenylethyl group, 2-phenylethyl group, and 2-phenylpropyl group. Among these, 2-phenylethyl group and 2-phenylpropyl group are preferred. In component (A), at least 30 mol % of $R^2$ in a molecule are the aryl groups or the aralkyl groups.

Furthermore, in the formula, "a" and "b" are positive numbers satisfying: $1 \leq a+b \leq 2.5$, and preferably $1.5 \leq a+b \leq 2.2$, and satisfying: $0.001 \leq a/(a+b) \leq 0.2$, and preferably $0.005 \leq a/(a+b) \leq 0.1$.

The state of component (A) at 25° C. is not limited and is preferably a liquid. The viscosity at 25° C. of component (A) is not limited; however, the viscosity is preferably in a range of 100 to 1,000,000 mPa·s. Note that in the present specification, viscosity is the value measured using a type B viscometer according to ASTM D 1084 at 23±2° C.

Component (A) may be one type of organopolysiloxane that satisfies the average composition formula above or may be a mixture of at least two types of organopolysiloxanes that satisfy the average composition formula above. Examples of such component (A) include organopolysiloxanes represented by the following "average composition formulas: average formulas". Note that, in the formulas, "Me", "Vi", "Hex", "Ph", "Phe", and "Php" respectively indicate methyl group, vinyl group, hexenyl group, phenyl group, 2-phenylethyl group, and 2-phenylpropyl group.

Vi$_{0.03}$Me$_{1.03}$Ph$_{0.97}$SiO$_{0.99}$: ViMe$_2$SiO(MePhSiO)$_{65}$SiMe$_2$Vi

Vi$_{0.10}$Me$_{1.10}$Ph$_{0.90}$SiO$_{0.95}$: ViMe$_2$SiO(MePhSiO)$_{18.4}$SiMe$_2$Vi

Vi$_{0.09}$Me$_{1.06}$Ph$_{0.91}$SiO$_{0.97}$: PhSi{O(PhMeSiO)$_{10}$SiMe$_2$Vi}$_3$

Hex$_{0.09}$Me$_{1.07}$Ph$_{0.89}$SiO$_{0.98}$: Si{O(PhMeSiO)$_{10}$SiMe$_2$Hex}$_4$

Hex$_{0.12}$Me$_{1.12}$Ph$_{0.88}$SiO$_{0.94}$: HexMe$_2$SiO(PhMeSiO)$_{15}$SiMe$_2$Hex

Vi$_{0.06}$Me$_{1.38}$Phe$_{0.63}$SiO$_{0.97}$: ViMe$_2$SiO(PheMeSiO)$_{20}$(Me$_2$SiO)$_{10}$SiMe$_2$Vi

Hex$_{0.06}$Me$_{1.38}$Php$_{0.63}$SiO$_{0.97}$: HexMe$_2$SiO(PhpMeSiO)$_{20}$(Me$_2$SiO)$_{10}$SiMe$_2$Hex

Component (B) is a curing agent of the present composition and is a compound having at least two thiol groups in a molecule. Component (B) is not limited as long as the component has sufficient solubility in component (A).

Examples of such component (B) include o-, m-, or p-xylenedithiol, ethyleneglycol bisthioglycolate, butanediol bisthioglycolate, hexanediol bisthioglycolate, ethyleneglycol bis(3-thiopropionate), butanediol bis(3-thiopropionate), trimethylolpropane tris(3-thiopropionate), pentaerythritol tetrakis(3-thiopropionate), trihydroxyethyl triisocyanuric acid tris(3-thiopropionate), and organopolysiloxanes substituted with a mercapto group.

The content of component (B) is an amount such that the amount of the thiol groups provided by the present component is in a range of from 0.2 to 2.0 mol, or optionally in a range of 0.3 to 1.6 mol, per 1 mol of the total alkenyl groups in component (A). This is because, when the content of component (B) is within the range described above, mechanical strength of the resulting cured product increases.

Component (C) is a component to initiate photocuring reaction of the present composition, and is a photoradical initiator containing a phosphorus atom. Examples of such component (C) include diphenyl(2,4,6-trimethylbenzoyl) phosphine oxide (trade name: TPO, manufactured by BASF), ethyl(2,4,6-trimethylbenzoyl) phenyl phosphonate (trade name: TPO-L, manufactured by BASF), and bis(2,4,6-trimethylbenzoyl) phenyl phosphine oxide (trade name: IRGACURE 819, manufactured by BASF).

The content of component (C) is in a range of from 0.01 to 5 parts by mass, optionally in a range of from 0.05 to 2 parts by mass, or optionally in a range of from 0.1 to 1.5 parts by mass, per 100 parts by mass of component (A). This is because, when the content of component (C) is within the range described above, curing efficiently proceeds to form a cured product having excellent heat resistance and light resistance.

Component (D) is a hydroxyphenyl triazine compound represented by the following general formula:

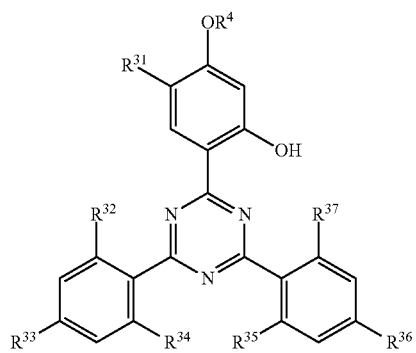

In the formula, $R^{31}$, $R^{32}$, $R^{33}$, $R^{34}$, $R^{35}$, $R^{36}$ and $R^{37}$ are the same or different, and are groups selected from hydrogen atoms, hydroxy groups or alkyl groups having from 1 to 12 carbons. Examples of the alkyl group include methyl group, ethyl group, propyl group, isopropyl group, butyl group, pentyl group, hexyl group, heptyl group, octyl group, nonyl group, decyl group, undecyl group, and dodecyl group. Among these, methyl group is preferred. Among these, $R^{31}$, $R^{34}$ and $R^{35}$ are preferably hydrogen atoms and $R^{32}$, $R^{33}$, $R^{36}$ and $R^{37}$ are preferably hydrogen atoms or alkyl groups having from 1 to 12 carbons.

In the formula, $R^4$ is a linear or branched alkyl group having from 6 to 12 carbons or a group represented by the following general formula:

—$CH_2CH(OH)CH_2OR^5$.

Among these, $R^4$ is preferably the group represented by the following general formula:

—$CH_2CH(OH)CH_2OR^5$.

Examples of the alkyl group for $R^4$ include hexyl group, heptyl group, octyl group, nonyl group, decyl group, undecyl group, and dodecyl group.

In the formula, $R^5$ is a linear or branched alkyl group having from 6 to 20 carbons. Examples of the alkyl group for $R^5$ include hexyl group, heptyl group, octyl group, nonyl group, decyl group, undecyl group, and dodecyl group.

Examples of such component (D) include a hydroxyphenyl triazine compound represented by the following formula:

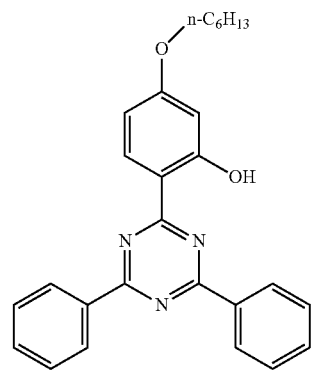

a hydroxyphenyl triazine compound represented by the following formula:

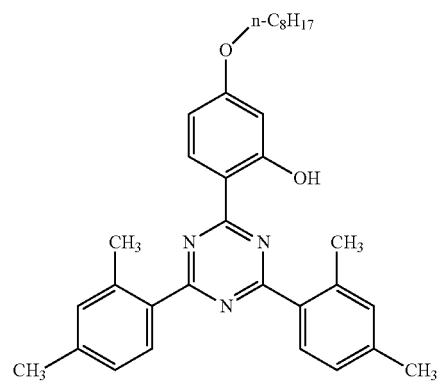

a hydroxyphenyl triazine compound represented by the following formula:

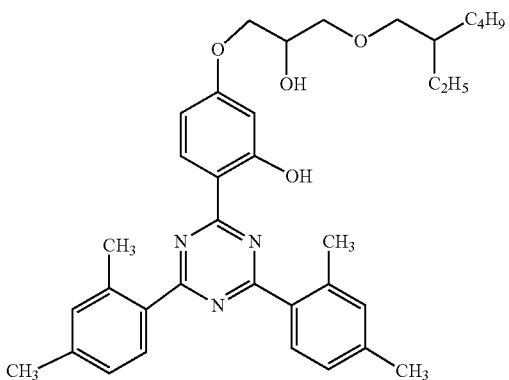

a hydroxyphenyl triazine compound represented by the following formula:

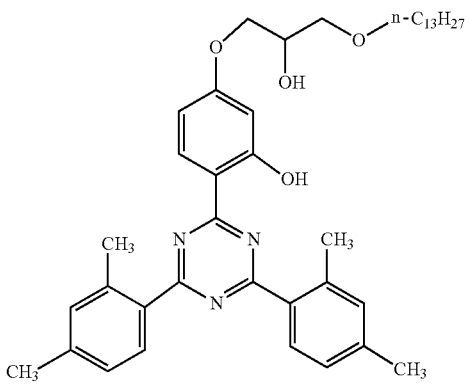

a hydroxyphenyl triazine compound represented by the following formula:

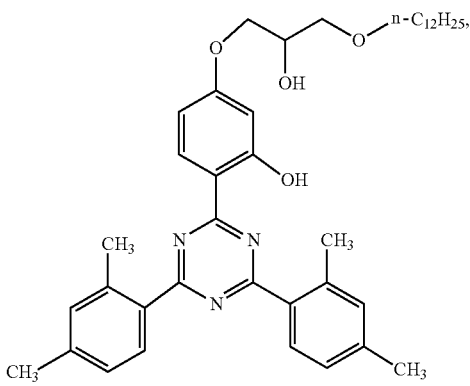

and mixtures thereof.

The content of component (D) is in a range of from 0.001 to 2 parts by mass, optionally in a range of from 0.01 to 1.5 parts by mass, or optionally in a range of from in a range of from 0.05 to 1.5 parts by mass, per 100 parts by mass of component (A). This is because, when the content of component (D) is within the range described above, curability of the composition by LED lamp increases.

The present composition comprises component (A) to component (D) described above; however, to impart heat resistance to a cured product of the present composition, (E) a hindered phenol compound is preferably contained. Examples of such component (E) include pentaerythritol tetrakis[3-(3,5-di-tert-butyl-4-hydroxyphenyl)propionate], thiodiethylene bis[3-(3,5-di-tert-butyl-4-hydroxyphenyl) propionate], octadecyl-3-(3,5-di-tert-butyl-4-hydroxyphenyl)propionate, 2,4-dimethyl-6-(1-methylpentadecyl)phenol, diethyl[{3,5-bis(1,1-di-tert-butyl-4-hydroxyphenyl) methyl}phosphonate, 3 3',3'',5,5',5''-hexane-tert-butyl-4-a, a',a''-(mesitylene-2,4,6-tolyl)tri-p-cresol, 4,6-bis (octylthiomethyl)-o-cresol, ethylenebis(oxyethylene)bis[3-(5-tert-butyl-4-hydroxy-m-tolyl)propionate], and hexamethylene bis[3-(3,5-di-tert-butyl-4-hydroxyphenyl) propionate].

The content of component (E) is not limited; however, the content is preferably in a range of 0.001 to 1 part by mass, and preferably in a range of 0.003 to 0.5 parts by mass, per 100 parts by mass of component (A). This is because, when the content of component (E) is within the range described above, change in viscosity of the composition prior to the photocuring is small and a cured product having excellent heat resistance and light resistance is obtained.

The present composition may further contain, as an optional component, to enhance storage stability in a light-shielded condition of the present composition, (F) a radical scavenger other than component (E) is preferably contained. Examples of such component (F) include hindered amines, such as N,N',N'',N'''-tetrakis(4,6-bis(butyl-(N-methyl-2,2,6, 6-tetramethylpiperidin-4-yl)amino)-triazin-2-yl)-4,7-diaza-decane-1,10-diamine, bis(1,2,2,6,6-pentamethyl-4-piperidyl)[[3,5-bis(1,1-dimethylethyl)-4-hydroxyphenyl] methyl]butylmalonate, methyl-1,2,2,6,6-pentamethyl-4-piperidylsebacate, bis(2,2,6,6-tetramethyl-4-piperidyl) sebacate, bis(1,2,2,6,6-pentamethyl-4-piperidyl)sebacate, and 8-acetyl-3-dodecyl-7,7,9,9-tetramethyl-1,3,8-triazaspiro[4.5]decane-2,4-dione; quinones or phenols, such as methylhydroquinone, 1,4-naphthoquinone, 4-methoxynaphthol, tert-butylhydroquinone, benzoquinone, pyrogallol, and phenothiazine.

The content of component (F) is not limited; however, the content is preferably in a range of 0.0001 to 1 part by mass, optionally 0.0001 to 0.1 parts by mass, or optionally 0.0001 to 0.05 parts by mass, per 100 parts by mass of component (A). This is because, when the content of component (F) is within the range described above, a cured product having excellent heat resistance and light resistance is obtained.

The present composition may further contain, as an optional component, (G) an organic compound having at least two ether bonds and at least one aliphatic carbon-carbon double bond in a molecule. The group having an aliphatic carbon-carbon double bond in component (G) is not limited, and examples thereof include an alkenyl group, an acryloyl group, and a methacryloyl group. Among these, an acryloyl group or a methacryloyl group is preferred. Furthermore, the state of component (G) at 25° C. is not limited and is preferably a liquid. The viscosity at 25° C. of component (G) is not limited; however, the viscosity is preferably in a range of 1 to 10000 mPa·s.

Examples of such component (G) include phenoxy diethylene glycol acrylate, phenoxy tetraethylene glycol acrylate, methoxy triethylene glycol acrylate, methoxy nonaethylene glycol acrylate, methoxy polyethylene glycol acrylate, ethoxy diethylene glycol acrylate, ethoxyethoxyethyl acrylate, nonylphenoxy tetraethylene glycol acrylate, nonylphenoxy octaethylene glycol acrylate, nonylphenoxy dipropylene glycol acrylate, methoxy diethylene glycol methacrylate, methoxy polyethylene glycol methacrylate, polyethylene glycol methacrylate, triethylene glycol diacrylate, polyethylene glycol diacrylate, dipropylene glycol diacrylate, tripropylene glycol diacrylate, polypropylene glycol diacrylate, bisphenol diethylene glycol diacrylate, bisphenol A triethylene glycol diacrylate, tetraethylene glycol diacrylate, bisphenol A polyethylene glycol diacrylate, diethylene glycol dimethacrylate, triethylene glycol dimethacrylate, polyethylene glycol dimethacrylate, polypropylene glycol dimethacrylate, bisphenol A diethylene glycol dimethacrylate, bisphenol A triethylene glycol dimethacrylate, bisphenol A tetraethylene glycol dimethacrylate, bisphenol A polyethylene glycol dimethacrylate, triethylene glycol divinyl ether, tripropylene glycol divinyl ether, polyethylene glycol monoallyl ether, methoxy polyethylene glycol allyl ether, propylene glycol allyl ether, butoxy polyethylene glycol/propylene glycol allyl ether, polyethylene glycol diallyl ether, polypropylene glycol diallyl ether, trimethylolpropane triallyl ether, trimethylolpropane diallyl ether, pentaerythritol tetraallyl ether, and pentaerythritol triallyl ether.

The content of component (G) is not limited, however, it is preferably in a range of 3 to 30 parts by mass, or optionally in a range of 5 to 20 parts by mass, per 100 parts by mass of component (A). This is because, when the content of component (G) is greater than or equal to the lower limit of the range described above, reduction in transmittance of the cured product at a high temperature/high humidity becomes small. On the other hand, when the content is less than or equal to the upper limit of the range described above, change in hardness of the cured product at a high temperature is made small and coloring is reduced.

The present composition may further contain, as an optional component, (H) an organic compound having at least one aliphatic carbon-carbon double bond in a molecule other than component (A) and component (G) described above; an adhesion-imparting agent; an inorganic filler, such as silica, titanium oxide, glass, alumina, or zinc oxide; an organic resin fine powder of polymethacrylate resin, silicone resin, or the like; as well as a pigment or a fluorescent substance, as long as the object of the present invention is not impaired.

Component (H) is not limited as long as a component is an organic compound having at least one aliphatic carbon-carbon double bond in a molecule and is preferably a liquid at 25° C. The viscosity at 25° C. of component (H) is not limited; however, the viscosity is preferably in a range of 1 to 500 mPa·s.

Examples of such component (H) include methyl acrylate, methyl methacrylate, butyl acrylate, butyl methacrylate, isobornyl acrylate, isobornyl methacrylate, isooctyl acrylate, lauryl acrylate, stearyl acrylate, isodecyl acrylate, triacrylate, hydroxyethyl acrylate, hydroxyethyl methacrylate, methoxyethyl acrylate, methoxyethyl methacrylate, phenoxyethyl acrylate, tetrahydrofuran acrylate, benzyl acrylate, o-phenylphenol ethoxyethyl acrylate, 2-ethylhexyl acrylate, hexane diol diacrylate, nonane diol diacrylate, 2-propenoic acid octahydro-4,7-methano-1H-inden-5-yl ester, decyl vinyl ether, 2-ethylhexyl vinyl ether, 1-octene, 1-decene, 1-dodecene, 1-tetradecene, 1-hexadecene, allyl methacrylate, divinyl sulfone, 3-methacryloxypropyltrimethoxysilane, and 3-acryloxypropyltrimethoxysilane.

Furthermore, examples the adhesion-imparting agent include silane compounds, such as 3-glycidoxypropyltrimethoxysilane, 2-(3,4-epoxycyclohexyl)ethyltrimethoxysilane, and 3-methacryloxy propyltrimethoxysilane; siloxane compounds having at least one of silicon atom-bonded alkenyl groups and/or silicon atom-bonded hydrogen atoms, and at least one silicon atom-bonded alkoxy group in a molecule; mixtures of a silane compound or siloxane compound having at least one silicon atom-bonded alkoxy group and a siloxane compound having at least one silicon atom-bonded hydroxy group and at least one silicon atom-bonded alkenyl group in a molecule; methyl polysilicate, ethyl polysilicate, and epoxy group-containing ethyl polysilicate. The content of the adhesion-imparting agent is not limited; however, the content is preferably in a range of 0.01 to 10 parts by mass per 100 parts by mass of component (A).

The viscosity at 25° C. of the present composition is not limited; however, the viscosity is preferably in a range of 100 to 100,000 mPa·s, or optionally in a range of 500 to 10,000 mPa·s. This is because, when the viscosity of the present composition is greater than or equal to the lower limit of the range described above, a cured product having high mechanical strength can be obtained. On the other hand, when the viscosity is less than or equal to the upper limit of the range described above, excellent coatability/workability of the resulting composition is achieved and formation of a void in the cured product is avoided.

<Cured Product>

The cured product of the present invention is obtained by irradiating the photocurable silicone composition described above with light. Examples of the light used to cure the present composition include ultraviolet light and visible light; however, the light with a wavelength in a range of 250 to 500 nm is preferred. This is because excellent curability is achieved, and the cured product is not decomposed by the light.

The cured product is typically optically transparent. This is because when the cured product is preferably used for an optical device or an image display, optical transparency is desired for high performance. The form of the cured product is not limited and may be in a sheet, film, or block form. The cured product may be combined with various substrates. The cured product is typically laminated between same or different substrates, and especially, between same or different substrates in an optical device.

The state of the cured product is not limited, but it is preferably an elastomer or gel. The hardness is preferably in a range of 0 to 80, or optionally in a range of 10 to 70, in Shore OO Hardness. This is because when the cure product is within the range described above, good cohesive strength against deformation and good flexibility against material fracture are obtained. Note that in the present specification, Shore OO Hardness is the value measured using a type OO hardness according to ASTM D 2240 at 23±2° C.

<Method of Producing the Cured Product>

A method of producing the cured product is not limited, but it is exemplified by a method comprising the following steps:

i-1) laminating the photocurable silicone composition of the present invention between same or different substrates providing that at least one of the substrates is transparent; and i-2) exposing the photocurable silicone composition to light through the transparent substrate.

In the step i-1, the photocurable silicone composition is applied on the surface of substrates blocking the light (for example, a black-color substrate). Examples of a coating method include a slit coating, a roll coating, a spin coating, a screen printing, or the like. A thickness of the photocurable silicone composition is not limited, but it is preferably in a range of from 50 to 1,000 μm, optionally in a range of from 50 to 500 μm, or optionally in a range of from 100 to 350 μm. Then, the transparent substrate having the light shielding portion is laminated on the surface of the photocurable silicone composition as prepared above. Laminating can be carried out either in the air or in vacuum. In order to prevent air bubbles generated during the laminating, it is preferable to laminate in vacuum. Also, laminating can be carried out under pressure, by a press or the like.

In the step i-2, for curing the transparent area, the ultraviolet-curing is conducted by ultraviolet irradiation. For example, low pressure, high pressure or ultrahigh pressure mercury lamp, metal halide lamp, (pulse) xenon lamp, or an electrodeless lamp is useful as an UV lamp. Irradiation dose is preferably in a range of from 5 to 6,000 mJ/cm$^2$, or optionally in a range of from 10 to 4,000 mJ/cm$^2$.

Due to the light shielding portion of the transparent substrate, light cannot be penetrated, and uncured photocurable silicone composition is present at the bottom of the light shielding portion. For curing the light-shielding portion, the side curing is conducted by UV LED (light emitting diode) lamp. Typical wavelengths of UV LED lamp are 365, 385, 395 and 405 nm. Preferably, 365 nm and 395 nm are generally used. Irradiance is preferably in a range of from 50 to 2,000 mJ/cm$^2$, or optionally in a range of from 100 to 1,000 mJ/cm$^2$. The irradiation time is preferably in a range of from 1 to 120 seconds, or optionally in a range of from 15 to 60 seconds. The term "uncured" denote the state where there is flowable under 25° C. environment.

Another method of producing the cured product may comprise the following steps:

ii-1) applying the photocurable silicone composition of the present invention on a transparent or intransparent (or opaque) substrate;

ii-2) exposing the photocurable silicone composition to light to form a silicone product in half-cure state;

ii-3) laminating the silicone product with another transparent or intransparent substrate; and ii-4) exposing the silicone product to light through the transparent substrate.

In the step ii-1, the photocurable silicone composition is applied on the surface of substrate. Examples of coating methods include the method mentioned above. A thickness of the photocurable silicone composition is not limited, but it is preferably in a range of from 50 to 1,000 μm, optionally in a range of from 50 to 500 μm, or optionally in a range of from 100 to 350 μm.

In the step ii-2, the applied photocurable silicone composition is partially cured by UV LED lamp to form unflowable and less-cured layer. The term "less-cured" denotes the state where there is no flowable at 25° C., but not fully crosslinked network (the state having middle physical properties between liquid and fully cured products). The ultraviolet-curing is conducted by ultraviolet irradiation, ultraviolet to does not matter source if the lamp for irradiating light rays near ultraviolet. Typically, to control cure rate precisely, UV LED lamp is generally used. Typical wavelengths of UV LED lamp are 365, 385, 395 and 405 nm. Preferably, 365 nm and 395 nm are generally used. Irradiation dose is preferably in a range of from 5 to 1,000 mJ/cm$^2$, or optionally in a range of from 10 to 500 mJ/cm$^2$. The irradiation of ultraviolet rays is usually in the air, the upper surface of the coating side (usually the atmosphere preferably irradiated from the surface). If need to prevent surface oxygen inhibition, the photocurable silicone composition may be irradiated with ultraviolet rays in an environment of a gas which does not cause curing inhibition such as nitrogen and carbon dioxide.

In the step ii-3, the transparent substrate with the light shielding portion is applied on the surface of the coated photocurable silicone composition as prepared in above. Laminating can be carried out either in the air and in vacuum. In order to prevent air bubbles generated during the laminating, it is preferable to laminate in vacuum. Also, laminating can be carried out under pressure, by a press or the like.

In the step ii-4, for curing the transparent area, the ultraviolet-curing is conducted by ultraviolet irradiation. For example, low pressure, high pressure or ultrahigh pressure mercury lamp, metal halide lamp, (pulse) xenon lamp, or an electrodeless lamp is useful as an UV lamp. Irradiation dose is preferably in a range of from 5 to 6,000 mJ/cm$^2$, or optionally in a range of from 10 to 4,000 mJ/cm$^2$.

Due to the light shielding portion of the transparent substrate, light cannot be penetrated, and uncured photocurable silicone composition is present at the bottom of the light shielding portion. For curing the light-shielding portion, the side curing is conducted by UV LED (light emitting diode) lamp. Typical wavelengths of UV LED lamp are 365, 385, 395 and 405 nm. Preferably, 365 nm and 395 nm are generally used. Irradiance is preferably in a range of from 50 to 2,000 mJ/cm$^2$, or optionally in a range of from 100 to 1,000 mJ/cm$^2$. The irradiation time is preferably in a range of from 1 to 120 seconds, or optionally in a range of from 15 to 60 seconds. The term "uncured" denote the state where there is flowable under 25° C. environment.

The cured product is useful as laminates in an optical device or an image display. The optical device is, for example, an optical semiconductor device. Examples of the optical semiconductor device include a light emitting diode (LED), a photocoupler, and a CCD. Moreover, a light emitting diode (LED) element and a solid-state image sensor are illustrated as an optical semiconductor element. In particular, even in the case of collectively sealing a so-called micro LED (mini LED) having a structure in which a large number of small LED elements are disposed on a substrate, the photocurable silicone composition of the present invention can be suitably used. At this time, the refractive index of the cured product may be adjusted as desired by selecting the type of functional group such as the content of aryl group. Furthermore, since the photocurable silicone composition of the present invention is excellent in heat resistance and moisture resistance, it is hard to cause a decrease in transparency and hardly causes turbidity. Therefore, there is an advantage that the light extraction efficiency of the optical semiconductor device including the Micro LED can be maintained well.

EXAMPLES

The photocurable silicone composition and the cured product of the present invention will now be described in detail using Practical Examples and Comparative Examples. Note that, in the formulas, "Me", "Ph", and "Vi" respectively indicates methyl group, phenyl group, and vinyl group. The characteristics of the photocurable silicone composition and the cured product thereof were measured as follows.

<Viscosity>

Viscosity at 23±2° C. was measured by using a type B viscometer (Brookfield LVF Type Rotational Viscometer with using Spindle #2 at 60 rpm) according to ASTM D 1084 "Standard Test Methods for Viscosity of Adhesive".

<Hardness>

The photocurable silicone composition was poured into a mold having a depression of a predetermined shape, and ultraviolet rays were irradiated from the upper liquid surface with a high pressure mercury lamp so that the cumulative irradiation amount was 4,000 mJ/cm². The hardness of the obtained cured product was measured by a type 00 durometer hardness tester according to the method specified by ASTM D 2240-00.

<Transmittance and Yellow Index (YI)>

The transmittance and yellow index of the plate-like cured product having a thickness of 500 μm cured as described above were measured by the method specified in ASTM D 1003 (UV-Visible spectrometer). The yellow index (YI) was measured in the same manner as above by ASTM D1925 (spectrophotometer, CM-3600A).

<QUV Aging Test>

The resistance to light fatigue was determined by means of a QUV Accelerated Weathering Tester (Q-Panel Co., Cleveland, Ohio) equipped with UVA-340 lamps calibrated to 0.89 W/m²/nm (ASTM G154 CYCLE 1). The plate-like cured product having a thickness of 500 μm cured as described above was irradiated in the QUV Accelerated Weathering Tester for a series of 12 hours per a cycle consisting of 8 hours of irradiation at the temperature of 60° C. and 4 hours of darkness (condensation) at a temperature of 50° C. Subsequently, the plate-like cured product was held for 48 cycles (24 days) and the yellow index (YI) were measured in the same manner as above.

<Deep Cure Property>

The photocurable silicone composition was poured into a mold composed of two black plates with a thickness of 2 cm, wherein the plates were separated by a spacer with a thickness of 500 μm. Ultraviolet light at a UV illuminance of 1000 mW/cm² was irradiated for 30 and 60 seconds from the upper liquid surface with a 365 nm LED lamp (FIREJET™ FJ100). Then, ultraviolet light at a UV illuminance of 200 mW/cm² was irradiated for 30 and 60 seconds from the upper liquid surface with a 395 nm LED lamp (FIREJET™ FJ100). After irradiation, the specimen was disassembled and the length (cm) of the portion losing fluidity by curing was measured.

Examples 1-2 and Comparative Examples 1-4

Photocurable silicone compositions were prepared by a planetary centrifugal vacuum mixer (Thinky mixer) from the following components using the composition (parts by mass) shown in Table 1. Note that the photocurable silicone compositions of Practical Examples 1-2 and Comparative Examples 1-4 were prepared to provide 0.8 moles of thiol groups in component (b1) with regard to 1 mole of total aliphatic carbon-carbon double bonds in components (a1) and (a2). The properties of this photocurable silicone compositions and cured product thereof are shown in Table 1.

The following organopolysiloxanes were used as component (A).

(a1) an organopolysiloxane that had a viscosity of 40,000 mPa·s and that was represented by the average formula:

$ViMe_2SiO(MePhSiO)_{92}SiMe_2Vi$ (the average composition formula: $Vi_{0.02}Me_{1.02}Ph_{0.98}SiO_{0.99}$)

(a2) an organopolysiloxane that had a viscosity of 3,000 mPa·s and that was represented by the average formula:

$ViMe_2SiO(MePhSiO)_{23}SiMe_2Vi$ (the average composition formula: $Vi_{0.08}Me_{1.08}Ph_{0.92}SiO_{0.96}$)

The following organic compounds were used as component (B).

(b1): trimethylolpropane tris(3-thiopropionate)

The following photoradical initiator was used as component (C).

(c1): ethyl (2,4,6-trimethylbenzoyl) phenyl phosphinate

The following hydroxyphenyl triazine compounds were used as component (D).

(d1) a hydroxyphenyl triazine compound represented by the following formula:

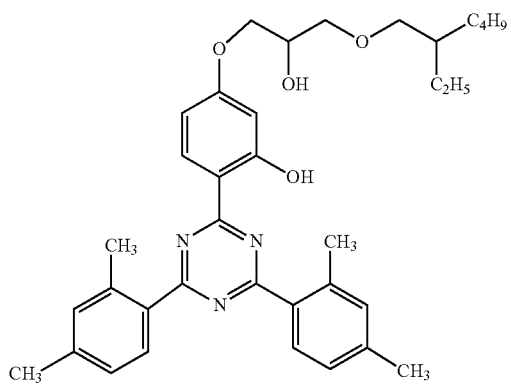

(d2) a mixture of a hydroxyphenyl triazine compound represented by the following formula:

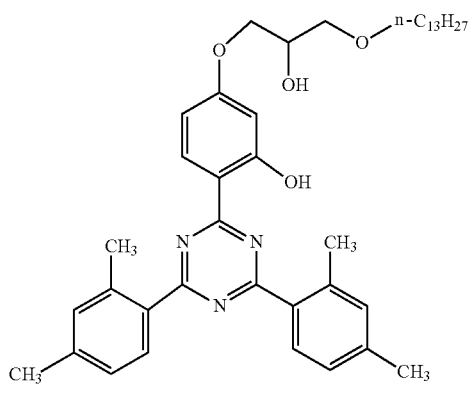

and a hydroxyphenyl triazine compound represented by the following formula:

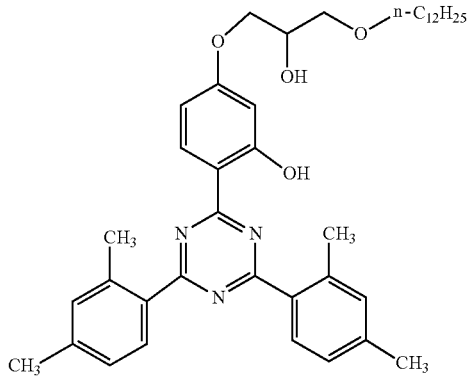

The following hydroxyphenyl triazine compounds were used as comparison of component (D).

(d3) a hydroxyphenyl triazine compound represented by the following formula:

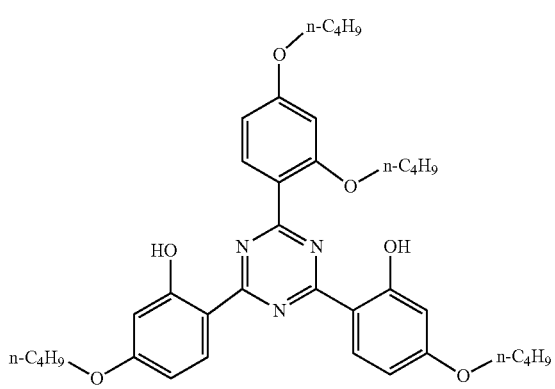

(d4) a hydroxyphenyl triazine compound represented by the following formula:

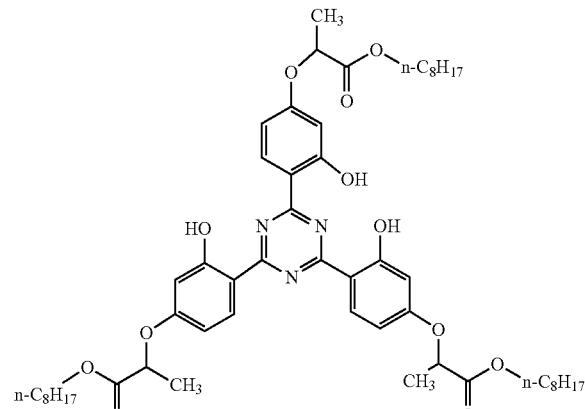

(d5) a hydroxyphenyl triazine compound represented by the following formula:

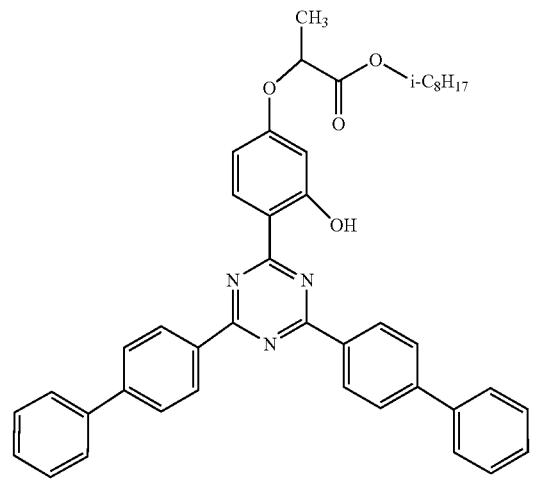

TABLE 1

| | | | Practical Examples | | Comparative Examples | | | |
|---|---|---|---|---|---|---|---|---|
| | | | 1 | 2 | 1 | 2 | 3 | 4 |
| Composition of photocurable silicone composition (part by mass) | (A) | (a1) | 33 | 33 | 33 | 33 | 33 | 33 |
| | | (a2) | 62.2 | 62.2 | 62.2 | 62.2 | 62.2 | 62.2 |
| | (B) | (b1) | 4.8 | 4.8 | 4.8 | 4.8 | 4.8 | 4.8 |
| | (C) | (c1) | 0.1 | 0.1 | 0.1 | 0.1 | 0.1 | 0.1 |
| | (D) | (d1) | 0.5 | — | — | — | — | — |
| | | (d2) | — | 0.5 | — | — | — | — |
| | | (d3) | — | — | — | 0.5 | — | — |
| | | (d4) | — | — | — | — | 0.5 | — |
| | | (d5) | — | — | — | — | — | 0.5 |
| Hardness | | | 66 | 66 | 65 | 65 | 65 | 66 |
| Transmittance (%) | @365 nm | | 2.35 | 7.55 | 96.79 | 0.00 | 0.00 | 0.08 |
| | @395 nm | | 93.70 | 95.94 | 100.00 | 60.88 | 33.55 | 79.16 |
| Yellow index | YI Value | | 0.3 | 0.28 | 0.24 | 0.57 | 0.71 | 0.56 |
| | YI Value After QUV | | 1.3 | 0.86 | 24.12 | 1.31 | 1.48 | 1.27 |
| Side (Deep) Cure Property (cm) | 365 nm, 1000 mW/cm$^2$ (30 sec) | | 1.0 | 1.1 | 2.0 | <0.1 | <0.1 | 0.4 |
| | 365 nm, 1000 mW/cm$^2$ (60 sec) | | 1.4 | 1.7 | 2.0 | 0.4 | <0.1 | 0.6 |
| | 395 nm, 200 mW/cm$^2$ (15 sec) | | 2.0 | 2.0 | 2.0 | 0.6 | 0.2 | 0.9 |
| | 395 nm, 200 mW/cm$^2$ (30 sec) | | 2.0 | 2.0 | 2.0 | 0.8 | 0.4 | 1.3 |

Comparative Example 1, due to lack of triazine additives, showed severe yellowing/browning during QUV aging test. The yellow index increased from 0.24 to 24.12. While, Practical Examples 1-2 and Comparative Examples 2-4, because of addition of triazine additives, showed good optical stability during QUV aging test. It revealed that these additives effectively stabilized cured products of photocurable silicone compositions under light irradiation condition. By the way, at the same time, these additives diminished the deep cure property due to high absorption at the range of UVA and UVB region as the transmittance were summarized in Table 1. Among them, it was revealed that specific hydroxyphenyl triazine compounds such as components (d1) and (d2) in Practical Examples 1 and 2, respectively, showed superior deep cure property compared to other hydroxylphenyl triazine compounds such as components (d3), (d4) and (d5) in Comparative Example 2, 3 and 4, respectively.

Examples 3-6 and Comparative Examples 5-8

Photocurable silicone compositions were prepared by a planetary centrifugal vacuum mixer (Thinky mixer) from the above components using the composition (parts by mass) shown in Table 2. Note that the photocurable silicone compositions of Practical Examples 3-6 and Comparative Examples 5-8 were prepared to provide 0.8 moles of thiol groups in component (b1) with regard to 1 mole of total aliphatic carbon-carbon double bonds in components (a1) and (a2). The properties of this photocurable silicone compositions and cured product thereof are shown in Table 2.

decreased, more yellowing appeared after QUV aging test. As the content of component (d1) increased, a slight negative impact appeared on deep cure property and initial yellowing. The preferred content of component (d1) seems to be less than 1 ppb and higher than 0.05 ppb (mass) of the composition. The most favorable range is 0.1 to 0.5 ppb (mass) of the composition. While, Comparative Example 5-8, in which component (d4) was used instead of component (d1), showed poor side cure property.

Examples 7-12 and Comparative Examples 9-13

Photocurable silicone compositions were prepared by a planetary centrifugal vacuum mixer (Thinky mixer) from the above components and the following components using the composition (parts by mass) shown in Table 3. Note that the photocurable silicone compositions of Practical Examples 7-12 and Comparative Examples 9-13 were prepared to provide 0.8 moles of thiol groups in component (b1) with regard to 1 mole of total aliphatic carbon-carbon double bonds in components (a1) and (a2). The properties of this photocurable silicone compositions and cured product thereof are shown in Table 3.

The following photoradical initiators were used as component (C).

(c2): a mixture of 90 mass % of ethyl (2,4,6-trimethylbenzoyl) phenyl phosphinate and 10 mass % of phenyl bis(2,4,6-trimethylbenzoyl) phosphine oxide (c3): bis(2,4,6-trimethylbenzoyl) phenyl phosphine oxide

TABLE 2

| | | | Practical Examples | | | | Comparative Examples | | | |
|---|---|---|---|---|---|---|---|---|---|---|
| | | | 3 | 4 | 5 | 6 | 5 | 6 | 7 | 8 |
| Composition of photocurable silicone composition (part by mass) | (A) | (a1) | 33 | 33 | 33 | 33 | 33 | 33 | 33 | 33 |
| | | (a2) | 62.2 | 62.2 | 62.2 | 62.2 | 62.2 | 62.2 | 62.2 | 62.2 |
| | (B) | (b1) | 4.8 | 4.8 | 4.8 | 4.8 | 4.8 | 4.8 | 4.8 | 4.8 |
| | (C) | (c1) | 0.1 | 0.1 | 0.1 | 0.1 | 0.1 | 0.1 | 0.1 | 0.1 |
| | (D) | (d1) | 1 | 0.25 | 0.1 | 0.05 | — | — | — | — |
| | | (d4) | — | — | — | — | 1 | 0.25 | 0.1 | 0.05 |
| Hardness | | | 65 | 65 | 65 | 65 | 37 | 65 | 65 | 65 |
| Transmittance (%) | @365 nm | | 0.1 | 13.0 | 35.3 | 51.5 | 0.0 | 0.0 | 0.9 | 4.1 |
| | @395 nm | | 87.1 | 96.1 | 98.2 | 98.9 | 3.6 | 48.3 | 70.5 | 79.7 |
| Yellow index | YI Value | | 0.43 | 0.31 | 0.23 | 0.21 | 1.51 | 0.51 | 0.36 | 0.3 |
| | YI Value After QUV | | 1.47 | 2.85 | 2.71 | 2.78 | 3.61 | 2.27 | 3.88 | 1.87 |
| Side (Deep) Cure Property (cm) | 365 nm, 1000 mW/cm$^2$ (30 sec) | | 0.5 | 1.1 | 1.6 | 1.9 | <0.1 | 0.2 | 0.3 | 0.5 |
| | 365 nm, 1000 mW/cm$^2$ (60 sec) | | 0.8 | 1.7 | 1.9 | 2.0 | <0.1 | 0.3 | 0.5 | 0.7 |
| | 395 nm, 200 mW/cmm$^2$ (15 sec) | | 1.5 | 2.0 | 2.0 | 2.0 | 0.1 | 0.6 | 1.1 | 1.3 |
| | 395 nm, 200 mW/cm$^2$ (30 sec) | | 2.0 | 2.0 | 2.0 | 2.0 | 0.1 | 0.8 | 1.4 | 1.9 |

Practical Examples 3-6 and Comparative Example 5-8 contained 0.1 ppb of component (c1). In Practical Examples 3-6 and Example 1, the amount of component (d1) was varied from 0.05 to 1. As the content of component (d1)

The following photoinitiators were used as comparison of component (C).

(c4) 1-hydroxy-cyclohexyl phenyl ketone
(c5) 2-hydroxy-2-methyl-1-phenyl propan-1-one

TABLE 3

| | | | Practical Examples | | | | | |
|---|---|---|---|---|---|---|---|---|
| | | | 7 | 8 | 9 | 10 | 11 | 12 |
| Composition of photocurable silicone composition (part by mass) | (A) | (a1) | 33 | 33 | 33 | 33 | 33 | 33 |
| | | (a2) | 62.2 | 62.2 | 62.2 | 62.2 | 62.2 | 62.2 |
| | (B) | (b1) | 4.8 | 4.8 | 4.8 | 4.8 | 4.8 | 4.8 |
| | (C) | (c1) | — | — | — | — | 0.2 | — |
| | | (c2) | 0.1 | 0.2 | 0.6 | 1.2 | — | — |
| | | (c3) | — | — | — | — | — | 0.2 |
| | | (c4) | — | — | — | — | — | — |
| | | (c5) | — | — | — | — | — | — |
| | (D) | (d1) | 0.5 | 0.5 | 0.5 | 0.5 | 0.5 | 0.5 |
| Hardness | | | 65 | 66 | 67 | 68 | 64 | 64 |
| Transmittance (%) | @365 nm | | 2.6 | 3.4 | 2.5 | 1.7 | 3.5 | 3.6 |
| | @395 nm | | 93.1 | 93.5 | 86.1 | 76.3 | 92.9 | 96.1 |
| Yellow index | YI Value | | 0.32 | 0.29 | 0.53 | 0.85 | 0.35 | 0.26 |
| | YI Value After QUV | | 2.62 | 2.46 | 4.41 | 7.47 | 2.51 | 1.68 |
| Side (Deep) Cure Property (cm) | 365 nm, 1000 mW/cm$^2$ (30 sec) | | 0.90 | 0.90 | 0.50 | 0.40 | 0.80 | 0.90 |
| | 365 nm, 1000 mW/cm$^2$ (60 sec) | | 1.20 | 1.10 | 0.70 | 0.60 | 1.20 | 1.80 |
| | 395 nm, 200 mW/cm$^2$ (15 sec) | | 1.90 | 1.70 | 1.20 | 0.60 | 1.60 | 2.00 |
| | 395 nm, 200 mW/cm$^2$ (30 sec) | | 2.00 | 2.00 | 1.40 | 0.90 | 2.00 | 2.00 |

| | | | Comparative Examples | | | | |
|---|---|---|---|---|---|---|---|
| | | | 9 | 10 | 11 | 12 | 13 |
| Composition of photocurable silicone composition (part by mass) | (A) | (a1) | 33 | 33 | 33 | 33 | 33 |
| | | (a2) | 62.2 | 62.2 | 62.2 | 62.2 | 62.2 |
| | (B) | (b1) | 4.8 | 4.8 | 4.8 | 4.8 | 4.8 |
| | (C) | (c1) | — | — | — | — | — |
| | | (c2) | — | — | — | — | — |
| | | (c3) | — | — | — | — | — |
| | | (c4) | — | — | — | — | 0.2 |
| | | (c5) | 0.1 | 0.2 | 0.6 | 1.2 | — |
| | (D) | (d1) | 0.5 | 0.5 | 0.5 | 0.5 | 0.5 |
| Hardness | | | NM | NM | NM | NM | NM |
| Transmittance (%) | @365 nm | | 2.9 | 3.9 | 3.0 | 3.1 | 3.0 |
| | @395 nm | | 95.7 | 95.9 | 95.7 | 95.3 | 95.4 |
| Yellow index | YI Value | | 0.36 | 0.35 | 0.21 | 0.26 | 0.32 |
| | YI Value After QUV | | 4.43 | 7.69 | 9.54 | 12.34 | 5.95 |
| Side (Deep) Cure Property (cm) | 365 nm, 1000 mW/cm$^2$ (30 sec) | | <0.1 | <0.1 | <0.1 | 0.20 | <0.1 |
| | 365 nm, 1000 mW/cm$^2$ (60 sec) | | <0.1 | <0.1 | <0.1 | 0.30 | 0.20 |
| | 395 nm, 200 mW/cm$^2$ (15 sec) | | <0.1 | <0.1 | <0.1 | 0.10 | <0.1 |
| | 395 nm, 200 mW/cm$^2$ (30 sec) | | <0.1 | <0.1 | <0.1 | 0.30 | 0.10 |

* where "NM" is "Not Measurable".

The phosphorous containing photoinitiators as shown in Practical Examples 7-12 showed superior deep cure property compared to Comparative Examples 9-13 containing simple phenyl ketone-type photoinitiators. As the amount of photoinitiator increases to 1 ppb, more severe yellowing appeared. The content is preferably <1 ppb, more preferably <0.05 of the composition.

Comparative Examples 14-24

Photocurable silicone compositions were prepared by a planetary centrifugal vacuum mixer (Thinky mixer) from the above components and the following components using the composition (parts by mass) shown in Table 4. Note that the photocurable silicone compositions of Comparative Examples 14-24 were prepared to provide 0.8 moles of thiol groups in component (b1) with regard to 1 mole of total aliphatic carbon-carbon double bonds in components (a1) and (a2). The properties of this photocurable silicone compositions and cured product thereof are shown in Table 4.

TABLE 4

| | | | Comparative Examples | | | | | |
|---|---|---|---|---|---|---|---|---|
| | | | 14 | 15 | 16 | 17 | 18 | 19 |
| Composition of photocurable | (A) | (a1) | 33 | 33 | 33 | 33 | 33 | 33 |
| | | (a2) | 62.2 | 62.2 | 62.2 | 62.2 | 62.2 | 62.2 |

TABLE 4-continued

| | | | | | | | | |
|---|---|---|---|---|---|---|---|---|
| silicone composition (part by mass) | (B) | (b1) | 4.8 | 4.8 | 4.8 | 4.8 | 4.8 | 4.8 |
| | (C) | (c1) | — | — | — | — | — | — |
| | | (c2) | — | — | — | — | 0.1 | 0.2 |
| | | (c3) | — | — | — | — | — | — |
| | | (c4) | — | — | — | — | — | — |
| | | (c5) | 0.1 | 0.2 | 0.6 | 1.2 | — | — |
| | (D) | (d4) | 0.5 | 0.5 | 0.5 | 0.5 | 0.5 | 0.5 |
| Hardness | | | NM | NM | NM | NM | 65 | 66 |
| Transmittance (%) | @365 nm | | NM | NM | NM | 0.0 | 0.0 | 0.0 |
| | @395 nm | | NM | NM | NM | 23.21 | 25.96 | 19.73 |
| Yellow index | YI Value | | NM | NM | NM | 0.94 | 0.85 | 1.21 |
| | YI Value After QUV | | NM | NM | NM | 2.45 | 2.31 | 4.92 |
| Side (Deep) Cure Property (cm) | 365 nm, 1000 mW/cm² (30 sec) | | <0.1 | <0.1 | <0.1 | <0.1 | <0.1 | 0.20 |
| | 365 nm, 1000 mW/cm² (60 sec) | | <0.1 | <0.1 | <0.1 | <0.1 | 0.30 | 0.20 |
| | 395 nm, 200 mW/cm² (15 sec) | | <0.1 | <0.1 | <0.1 | <0.1 | 0.40 | 0.30 |
| | 395 nm, 200 mW/cm² (30 sec) | | <0.1 | <0.1 | <0.1 | <0.1 | 0.70 | 0.50 |

| | | | Comparative Examples | | | | |
|---|---|---|---|---|---|---|---|
| | | | 20 | 21 | 22 | 23 | 24 |
| Composition of photocurable silicone composition (part by mass) | (A) | (a1) | 33 | 33 | 33 | 33 | 33 |
| | | (a2) | 62.2 | 62.2 | 62.2 | 62.2 | 62.2 |
| | (B) | (b1) | 4.8 | 4.8 | 4.8 | 4.8 | 4.8 |
| | (C) | (c1) | — | — | — | 0.2 | — |
| | | (c2) | 0.6 | 1.2 | — | — | — |
| | | (c3) | — | — | — | — | 0.2 |
| | | (c4) | — | — | 0.2 | — | — |
| | | (c5) | — | — | — | — | — |
| | (D) | (d4) | 0.5 | 0.5 | 0.5 | 0.5 | 0.5 |
| Hardness | | | 66 | 66 | NM | 66 | 66 |
| Transmittance (%) | @365 nm | | 0.0 | 0.0 | NM | 0.0 | 0.0 |
| | @395 nm | | 19.56 | 14.80 | NM | 21.11 | 23.57 |
| Yellow index | YI Value | | 1.11 | 1.48 | NM | 1.07 | 0.86 |
| | YI Value After QUV | | 6.09 | 7.24 | NM | 5.12 | 1.68 |
| Side (Deep) Cure Property (cm) | 365 nm, 1000 mW/cm² (30 sec) | | 0.20 | <0.1 | <0.1 | <0.1 | <0.1 |
| | 365 nm, 1000 mW/cm² (60 sec) | | 0.40 | 0.30 | 0.10 | 0.20 | 0.30 |
| | 395 nm, 200 mW/cm² (15 sec) | | 0.30 | 0.30 | <0.1 | 0.40 | 0.40 |
| | 395 nm, 200 mW/cm² (30 sec) | | 0.50 | 0.50 | <0.1 | 0.60 | 0.60 |

* where "NM" is "Not Measurable".

All Comparative Examples 14-24, because of including component (d4), showed poor deep cure property.

INDUSTRIAL APPLICABILITY

The present composition is cured easily by irradiation with a high energy ray, such as ultraviolet light and visible light, provides transparent cured products, and has excellent deep curability. Therefore, the present composition is useful as various potting agents, sealing agents, and adhesive agents. The present cured product has high optical transparency, and excellent adhesion property. Therefore, the present cured product is useful as laminates such as for optical devices and image displays.

What is claimed is:

1. A photocurable silicone composition comprising:
(A) 100 parts by mass of an organopolysiloxane represented by the following average composition formula:

wherein, $R^1$ is an alkenyl group having from 2 to 12 carbons, $R^2$ is an alkyl group having from 1 to 12 carbons, an aryl group having from 6 to 12 carbons, or an aralkyl group having from 7 to 12 carbons; provided that, at least 30 mol % of $R^2$ in a molecule are the aryl groups or the aralkyl groups; and "a" and "b" are positive numbers satisfying: $1 \leq a+b \leq 2.5$ and $0.001 \leq a/(a+b) \leq 0.2$;

(B) a compound having at least two thiol groups in a molecule, in an amount that the amount of the thiol groups in the present component is in a range of from 0.2 to 2.0 mol per 1 mol of the total alkenyl groups in component (A);

(C) from 0.01 to 5 parts by mass of a photoradical initiator having a phosphorus atom; and (D) from 0.001 to 2 parts by mass of a hydroxyphenyl triazine compound represented by the following general formula:

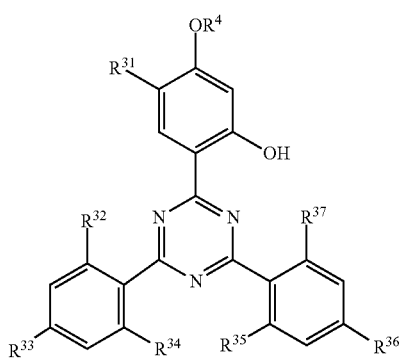

wherein, $R^{31}, R^{32}, R^{33}, R^{34}, R^{35}, R^{36}$ and $R^{37}$ are the same or different, and are groups selected from hydrogen atoms, hydroxy groups or alkyl groups having from 1 to 12 carbons, $R^4$ is a group represented by the following general formula:

—CH$_2$CH(OH)CH$_2$OR$^5$ wherein, $R^5$ is a linear or branched alkyl group having from 6 to 20 carbons.

2. The photocurable silicone composition according to claim 1, wherein $R^{31}$, $R^{34}$ and $R^{35}$ in component (D) are hydrogen atoms and $R^{32}$, $R^{33}$, $R^{36}$ and $R^{37}$ in component (D) are hydrogen atoms or alkyl groups having from 1 to 12 carbons.

3. The photocurable silicone composition according to claim 1, wherein component (D) is present in an amount of from 0.01 to 1.5 parts by mass per 100 parts by mass of component (A).

4. The photocurable silicone composition according to claim 1, wherein component (D) is a hydroxyphenyl triazine compound selected from a hydroxyphenyl triazine compound represented by the following formula;

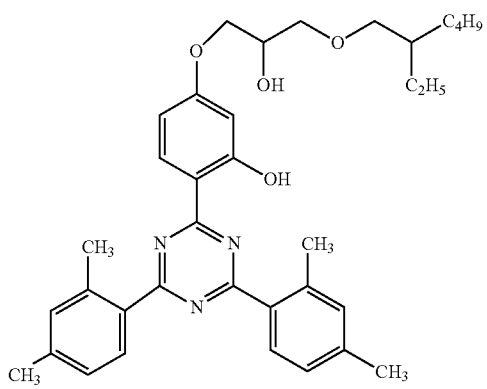

a hydroxyphenyl triazine compound represented by the following formula:

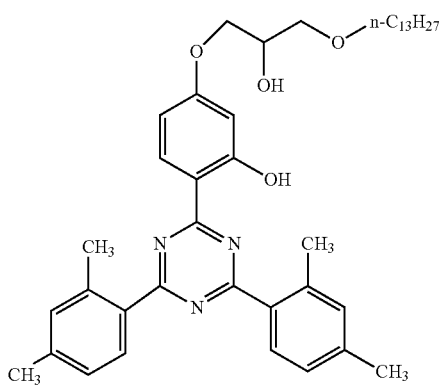

a hydroxyphenyl triazine compound represented by the following formula:

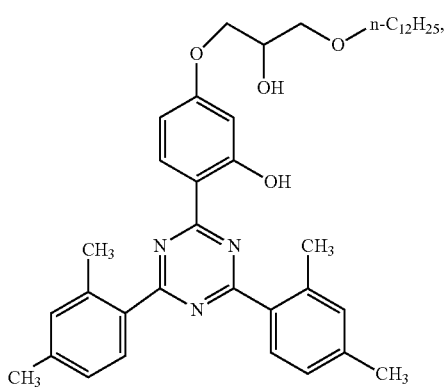

and mixtures thereof.

5. A cured product obtained by irradiating the photocurable silicone composition according to claim 1 with light.

6. The cured product according to claim 5, wherein the cured product is laminated between same or different substrates.

7. The cured product according to claim 5, wherein the cured product is laminated between same or different substrates in an optical device.

8. The photocurable silicone composition according to claim 1, wherein component (D) is a hydroxyphenyl triazine compound represented by the following formula:

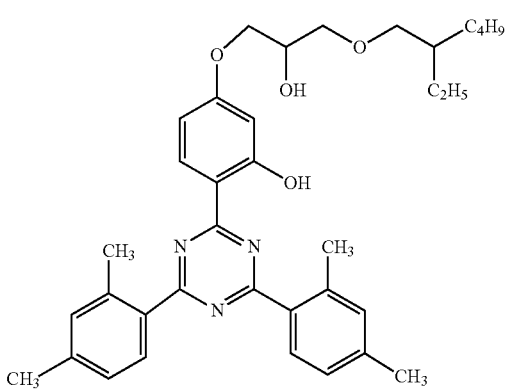

9. The photocurable silicone composition according to claim 1, wherein component (D) is a hydroxyphenyl triazine compound represented by the following formula:
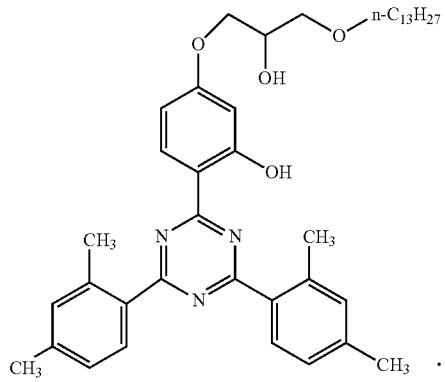
10. The photocurable silicone composition according to claim 1, wherein component (D) is a hydroxyphenyl triazine compound represented by the following formula:
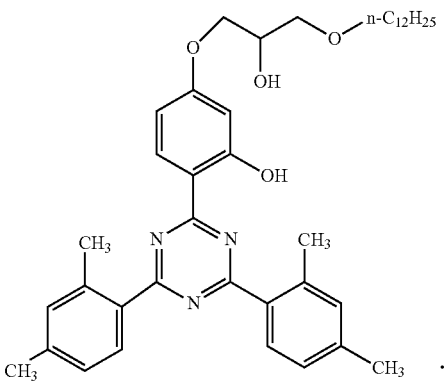
* * * * *